Oct. 20, 1964    W. VUTZ    3,153,334
POWER TRANSMITTING MECHANISM
Filed April 9, 1963

INVENTOR.
WILHELM VUTZ
BY
Walter V. Wright
AGENT

United States Patent Office 3,153,334
Patented Oct. 20, 1964

3,153,334
POWER TRANSMITTING MECHANISM
Wilhelm Vutz, New Holland, Pa., assignor to Sperry Rand Corporation, New Holland, Pa., a corporation of Delaware
Filed Apr. 9, 1963, Ser. No. 271,720
9 Claims. (Cl. 64—28)

This invention relates generally to mechanism for transmitting power in the form of torque. More specifically, this invention relates to safety and control means in a torque transmitting mechanism.

In the designing of drive trains for machinery, such as farm machinery for example, it is common practice to protect relatively expensive and/or inaccessible elements of the drive trains against structural failure by providing at some readily accessible place in the drive train an inexpensive part having a predetermined relatively low strength. Then, if the machine becomes overloaded or jammed in such a manner as to cause structural failure in the drive train, the failure will most likely occur in the predetermined, inexpensive part which is readily accessible for replacement. This mechanical design practice is similar to the electrical practice of providing fuses in an electrical circuit to protect expensive or inaccessible electrical equipment. The merits of this practice in minimizing repair time and costs are readily apparent.

A well known method of providing this safety feature in mechanical drive trains is by the use of shear pins. For example, if the output shaft of an inaccessible, complex gearbox carries a sprocket, gear, or other equivalent member, it would be common to find this driven member locked to the shaft by a pin inserted through registering radial holes in the shaft and gear, or sprocket hub. The shear pin would have a predetermined shear strength below that of the driven member and the elements inside the gearbox. If the drive train becomets locked or jammed, the shear pin will fail and relieve the stress on the drive train before harm can come to the driven gear or to the expensive gearbox. All that is required to repair the damage is to realign the holes and insert a new pin.

While this is a good design practice, there are certain undesirable results which often accompany the use of shear pins. When shearing of the pin occurs, the shaft and driven member are free to rotate relative to each other. The sharp, sheared end of the portion of the pin remaining in the hub of the gear or sprocket is carried around the surface of the shaft, while the sheared end of the portion of the pin remaining in the shaft is carried around the bore of the hub of the rotatable member. This frequently results in undesirable galling of these two surfaces. In severe cases it may be necessary to refinish the surfaces, or even replace one or both the parts.

In some power transmitting installations it is desirable to be able to vary the amount of power, or torque, that the drive train is capable of transmitting before it undergoes mechanical failure. For instance, a particular shear pin connected sprocket and drive shaft may be selectively connectable into two or more drive trains. One of the drive trains may have a lower overall strength than the other. Thus, if the drive sprocket is disconnected from one drive train and connected into the other, it is necessary to replace the shear pin with one having the proper shear strength for the drive train in which it will be used. If the operator neglects to change shear pins, damage may occur in the drive train if an overload condition arises. In a power installation such as the above, the operator is required to carry a supply of two different sets of shear pins. Although the shear pins have different shear strengths, they are identical in size and similar in appearance. It is very easy to get two shear pins of different strengths mixed. This may result in costly damage to one of the drive trains of a machine, should a pin of the wrong strength be used.

It is the general object of this invention to overcome the above undesirable features accompanying the use of shear pins.

It is another object of this invention to provide, in a power transmitting mechanism, a shear pin assembly whereby upon failure of the shear pin galling of the shaft is held to a permissible minimum and occurs axially along the shaft.

It is another object of this invention to provide a shear pin arrangement for a power transmitting mechanism whereby the torque transmitting ability of the mechanism prior to failure of the shear pin is easily adjustable.

It is another object of this invention to provide a power transmitting mechanism which is adjustable to selectively produce a wide range of torque transmitting values from a single shear pin.

These and other objects and advantages of this invention will be apparent upon reference to the following description and claims taken in conjunction with the accompanying drawings wherein:

Figures 1, 2:
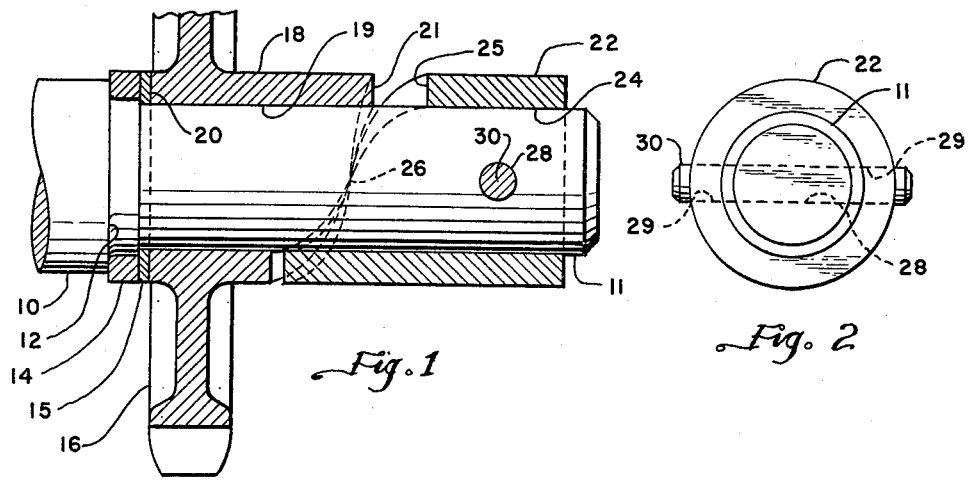
FIG. 1 is a side view, partly in section, showing power transmitting mechanism embodying the shear pin safety device constructed in accordance with the principles of this invention.
FIG. 2 is an end view of the mechanism shown in FIG. 1.

The first embodiment of the invention which is seen in FIGS. 1 and 2 includes a shaft 10 which is part of a mechanical drive train. The shaft 10 has an end portion 11 of reduced diameter, thus providing an annular shoulder 12 spaced axially from the end of the shaft. A thrust washer, or thrust ring, 14 is carried by the reduced diameter portion 11 of shaft 10 and bears against shoulder 12. One or more removable annular shims, or washers, 15 (one shown) is carried by the shaft 10 and abuts thrust ring 14. The next part received on shaft 10 is a sprocket member 16 having a hub portion 18. Hub 18 has an axial bore 19 bearing rotatably on portion 11 of the shaft 10. One axial end 20 of hub 18 abuts shim 15. The other axial end of hub 18 is provided with a cam surface 21 which extends obliquely around at least a portion of the circumference of the shaft. This cam surface will be more fully described hereafter. A sleeve member 22 having a bore 24 is received on portion 11 of the shaft. Sleeve 22 has a cam surface 25 provided on one axial end of the sleeve. The cam surface 25 abuts cam surface 21 of the hub 18 as shown at 26 in FIG. 1. A hole 28 extends radially through the shaft 10 adjacent the end of the shaft. As seen in FIG. 2, a similar radial hole 29 extends through sleeve member 22. The hole 29 through sleeve 22 is aligned with hole 28 in the shaft. A shear pin 30 having a predetermined shear strength extends through the holes 28 and 29 and is disposed partially within the shaft and partially within sleeve 22. Pin 30 locks sleeve 22 against both axial and rotational movement relative to the shaft 10.

Figure 5:
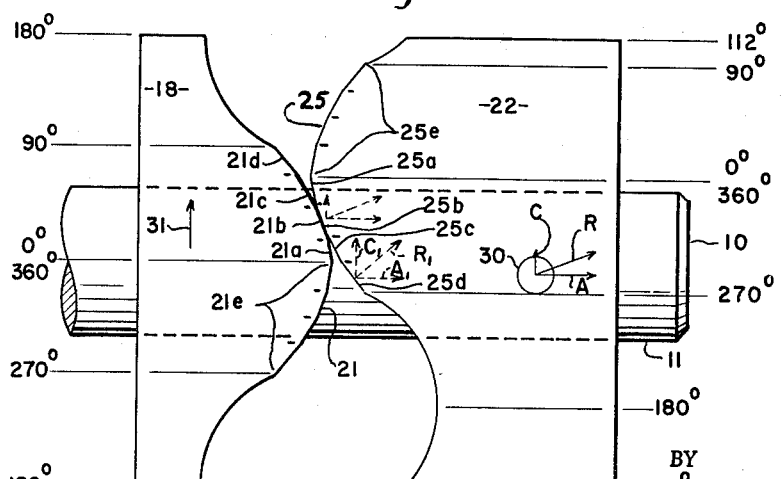
FIG. 5 is a diagrammatic showing of the cam surfaces seen in FIGS. 1 and 2 as they would appear if the annular members on which they are formed were cut longitudinally and spread out on a planar surface.

Attention is now directed to FIG. 5 which shows an enlarged profile of the cam surfaces 21 and 25 on hub 18 and sleeve 22. FIG. 5 shows the hub and sleeve as they would appear if they were cut on one side along the axis of the shaft 10 and unwrapped from the shaft so as to be lying in a plane. Both the hub 18 and the sleeve 22 are marked to indicate the three hundred sixty degrees of extent about the periphery of the shaft. The degree markings have arbitrarily been started and concluded at the high point of each of the respective cam surfaces 21 and 25. The end surface 21 of hub 18 is divided into four ninety degree portions, or quadrants. The first quadrant from zero to ninety degrees constitutes one working portion of the cam surface 21. This quadrant is shown as being divided equally into four portions marked, respectively, 21a, 21b, 21c and 21d. The portion 21a extends at an angle of eighty degrees to the axis of the shaft. The portion 21b extends at an angle of seventy degrees to the axis of the shaft. The portion 21c extends at an angle of sixty degrees to the axis of the shaft. The portion 21d extends at an angle of fifty degrees to the axis of the shaft. It will be apparent in FIG. 5 that the quadrant of surface 21 extending between two hundred seventy degrees and three hundred sixty degrees is identical but opposite to the quadrant between zero degrees and ninety degrees. The circumferential portion of surface 21 lying between ninety degrees and two hundred seventy degrees is a non-working surface. This portion of the axial end of hub 18 is merely undercut to provide sufficient clearance to enable portion 21d of surface 21 to engage the portion marked 25d of sleeve cam surface 25. It will also be apparent from FIG. 5 that the sleeve cam surface 25 is identical to hub cam surface 21. The portions of cam surface 25 marked 25a, 25b, 25c and 25d, are selectively engageable, respectively, with portions 21a, 21b, 21c and 21d of hub cam surface 21. In FIG. 5, the portion 21b of surface 21 is shown in engagement with portion 25b of cam surface 25. If it were desired to have portion 21d of cam surface 21 engage portion 25d of cam surface 25, the procedure would be as follows: remove shear pin 30 from sleeve 22 and shaft 10, remove sleeve 22 and hub 18 from the shaft, add two more shims 15 to shaft 10 (FIG. 1), replace hub 18 on portion 11 of the shaft in abutting relation to the shims, rotate hub 18 downwardly in FIG. 5 to align portion 31d axially with portion 25d, replace sleeve 22 on portion 11 of the shaft in the exact position shown in FIGS. 5 and 1, and reinsert shear pin 30 in holes 28 and 29 of the shaft 10, and sleeve 22. In this manner, and by varying the number of shims 15, any of the portions of cam surface 21 may be engaged with the similar portion of cam surface 25.

With the parts in the positions shown in FIG. 5, assume now that a force is driving sprocket 16, and its hub 18, in the direction indicated by arrow 31 in FIG. 5. The rotational force is transmitted through portion 21b of cam surface 21 to portion 25b of cam surface 25. Due to the seventy degree angle between surfaces 21b and 25b and the axis of shaft 10, the rotational force on hub 18 is divided into a circumferential component and an axial component relative to the shaft. The total force, or the resultant of the axial and circumferential components, is transmitted through sleeve 22 to shear pin 30. However, only the circumferential component of the force (approximately 35% of the total force) is effective to drive shaft 10 in rotation through shear pin 30. The axial component of the force (approximately 94% of the total force) acts axially relative to shaft 11 and is ineffective to produce rotation of shaft 10. However, the total driving force applied to hub 18 (the resultant of the circumferential and axial components of the force transmitted through portions 21b and 25b of cam surfaces 21 and 25) is acting on shear pin 30 and attempting to fracture the pin. Assuming that the vector R applied to pin 30 in FIG. 5 represents the magnitude of force which will cause the pin 30 to shear, the maximum amount of force attempting to drive shaft 10 in rotation at the time of pin failure is represented by the circumferential vector C. The shear pin arrangement of the present invention exhibits the following advantages over the conventional shear pin connection: upon failure of pin 30, the cam surface 21 will drive sleeve 22 axially along shaft 10. The extent of axial movement of sleeve 22 will only be an amount sufficient to allow the high point of cam surface 21 to slip by the high point of cam surface 25. At this point, hub 18 of sprocket 16 will be free to rotate on the shaft 10. Thus, any galling of shaft 10 or bore 24 of sleeve 22 will be confined to a small area extending axially from pin 30 toward the end of shaft 10. With a conventional shear pin connection, galling could occur around the entire circumference of the shaft and the entire bore of the sprocket member. Another advantage of the present mechanism is that the torque value of the shear pin connection can be selectively increased or decreased if desired, using the same shear pin 30. If it were desired to decrease the torque value of the connection (represented by circumferential vector C in FIG. 5), portion 21a of cam surface 21 could be set in engagement with portion 25a of cam surface 25 by removing shim 15 (FIG. 1). This would give a smaller circumferential component C and a larger axial component A for the same total shear pin strength (vector R). By engaging cam surface portion 21d with cam surface portion 25d the torque value of the connection would be increased from the amount represented by the vector C in FIG. 5 to the amount represented by vector $C_1$ applied to portion 25d of the cam surface 25. This increase in the torque value, or circumferential vector, is due to the increased cam angle of surfaces 21d and 25d over that of surfaces 21b and 25b. The total shearing force on the pin represented by vectors R and $R_1$ are equal in either case; only the magnitude of the axial and circumferential components are changed. Thus, with this invention, a manufacturer may make one shear pin device for use on a plurality of different machines requiring different torque values while only having to make and stock one type of shear pin, and simultaneously reduce the galling effect accompanying failure of the shear pin.

It will be apparent from FIGS. 1 and 5 that since the axial end 20 of hub 18 abuts a fixed stop means (thrust ring 14), the operation of the shear pin assembly of this invention is the same whether hub 18 is driving shaft 10 in the direction indicated by arrow 31 in FIG. 5 or if shaft 10 is driving hub 18 via pin 30 and sleeve 22 in a direction opposite to that indicated by arrow 31 in FIG. 5. The same mechanism may be used to drive shaft 10 by hub 18 in the direction opposite to that of arrow 31, or to drive hub 18 in the direction indicated by the arrow 31 via shaft 10, pin 30 and sleeve 22, simply by moving one of the cam portions collectively indicated by the reference numeral 21e of surface 21 into engagement with one of the cam portions indicated collectively by the numeral 25e of surface 25.

Figures 3, 4:
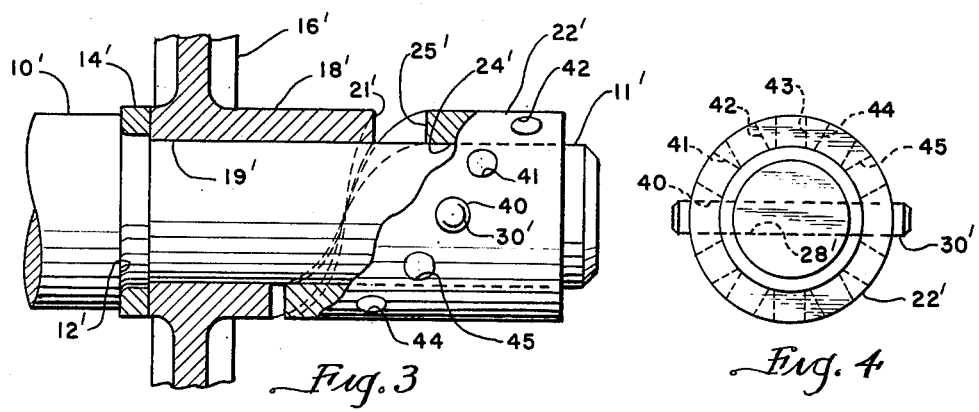
FIG. 3 is a view similar to FIG. 1 showing another embodiment of the invention.
FIG. 4 is an end view of the mechanism shown in FIG. 3.

At this point it should be noted that the particular number of portions (a, b, c and d) of cam surfaces 21 and 25 shown in FIG. 5 and their particular angles, relative to the shaft axis, are merely exemplary. More, or fewer, portions may be provided and steeper or shallower angles may be employed. Since the transfer of force between hub cam 21 and sleeve cam 25 requires only "point" contact between these two surfaces, the portions 21 and 25 a, b, c and d may be made infinitely small, or in other words, the cam surfaces between 0° and 90° and between 270° and 360° may be rounded into continuous curved surfaces, as shown in FIGS. 1 and 3. The number and thickness of shims 15 employed controls the point of contact of the cam surfaces, and therefore, the angle of transfer of force between the surfaces. The two cam surfaces 21 and 25 do not necessarily have to be identical. For example, one of the surfaces could be in the form of a simple rounded cam follower lug. It should also be obvious that the depicting of member 16 as a sprocket is merely exemplary. It could be a gear or any other rotary member having a hub.

In the second embodiment of this invention shown in FIGS. 3 and 4, many of the members are identical to those of the embodiment of FIGS. 1 and 2. Such members have been indicated by identical primed reference numerals. It should be noted in FIGS. 3 and 4 that the shims 15 of the preferred embodiment have been eliminated. The sprocket member 16' bears directly against thrust ring 14'. In the second embodiment, a plurality of radial holes 40, 41, 42, 43, 44 and 45 (FIG. 4) are provided in sleeve member 22'. These holes are spaced axially and circumferentially from each other. The axial and circumferential adjustment required for engagement of different portions of the cam surfaces 21' and 25' is accomplished by selectively aligning the desired radial hole in sleeve 22' with the shear pin hole 28' (FIG. 4) in shaft 11' before inserting shear pin 30'. The holes 40, 41 and 42, for example, may be spaced and located so as to, respectively, cause engagement of cam surfaces 21' and 25' at the low-point, mid-point and high-point of one pair of the working portions of these cam surfaces; while holes 43, 44, and 45, respectively, cause engagement of the high-point, mid-point and low-point of the other pair of working portions of the cam surfaces. In all other respects, the second embodiment is the same as the first embodiment.

While this invention has been described in connection with particular embodiments thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. Mechanism for controlling the transmission of torque between a drive member and a driven member wherein one of said members is a shaft and the other of said members has a hub receivable axially on said shaft, said mechanism comprising stop means on said shaft against which one axial end of said hub abuts to prevent movement of the hub axially along said shaft, said shaft extending through said hub and projecting axially beyond the end thereof opposite said one end, a cam surface on the axial end of said hub opposite said one end, said cam surface extending circumferentially around at least a portion of said shaft and obliquely relative to the axis of the shaft, a sleeve on the axially projecting end of said shaft, said sleeve having one end abutting said diagonal cam surface of the hub whereby any force transmitted through said cam surface between said hub and said sleeve will have a circumferential component and an axial component acting on said sleeve, said axially projecting end of said shaft having a radially extending hole therein, said sleeve having a radially extending hole therethrough registering with said hole in said shaft, a pin having a predetermined shear strength disposed partially in each of said holes and locking said sleeve and thereby said hub against axial and circumferential movement relative to said shaft, said pin failing in shear if the resultant of said circumferential and axial components of a force transmitted through said cam surface exceeds said predetermined shear strength of the pin whereupon said axial component of force acting through said cam surface drives said sleeve axially out of engagement with said hub cam surface thereby freeing said hub for rotation on and about said shaft.

2. Mechanism for controlling the transmission of torque between a driving member and a driven member wherein one of said members is a shaft and the other of said members has a hub receivable axially on said shaft, said mechanism comprising stop means on said shaft, one axial end of said hub abutting said stop means to prevent movement of said hub axially along said shaft beyond said stop means, said shaft extending through said hub and projecting axially beyond the end thereof opposite said one end, cam means at the axial end of said hub opposite said one end and embodying a cam surface, said cam surface extending circumferentially around at least a portion of said shaft and obliquely relative to the axis of the shaft and dividing any force transmitted through said cam surface into a circumferential component and an axial component, a sleeve received axially on the projecting end of said shaft and having a cam surface at one axial end thereof abutting said first mentioned cam surface, said shaft having a radial hole therein, said sleeve having a radial hole therein registering with said radial hole in the shaft, and a pin having a predetermined shear strength disposed partially in each of said holes and locking said sleeve against axial and circumferential movement relative to said shaft thereby locking said hub to said shaft.

3. Mechanism for controlling the transmission of torque between a drive member and a driven member wherein one of said members is a shaft and the other of said members has a hub receivable axially on said shaft, said mechanism comprising stop means on said shaft against which one axial end of said hub abuts to prevent movement of said hub axially along said shaft, said shaft extending through said hub and projecting axially beyond the end thereof opposite said one end, a sleeve on the axially projecting end of said shaft, said shaft having a radially extending hole therein, said sleeve having a radially extending hole therein registering with said radial hole in said shaft, a pin having a predetermned shear strength disposed partially in each of said holes and locking said sleeve against axial and circumferential movement relative to said shaft, and means interengaging said hub and said sleeve and dividing a torque applied to the driving one of said members into a circumferential component of force and an axial component of force acting on said sleeve.

4. Mechanism for controlling the transmission of torque between a drive member and a driven member as recited in claim 3 wherein said means interengaging said hub and said sleeve comprises a cam surface on the axial end of said hub opposite said one end and against which one end of said sleeve abuts, said cam surface extending circumferentially around at least a porton of said shaft and obliquely relative to the axis of the shaft and dividing a torque applied to the driving one of said members into a circumferential component of force and an axial component of force acting on said sleeve, said stop means being axially adjustable to vary the point of engagement of said cam surface and said sleeve, circumferentially spaced portions of said cam surface having different angles of obliquity relative to the axis of said shaft whereby the magnitudes of said circumferential and axial components of force may be selectively varied by circumferentially and axially varying the point of engagement of said cam surface and said sleeve.

5. Mechanism for controlling the transmission of torque between a drive member and a driven member as recited in claim 3 wherein said means interengaging said hub and said sleeve comprises a cam surface on one axial end of said sleeve and abutting the end of said hub opposite said one end, said cam surface extending circumferentially around at least a portion of said shaft and obliquely relative to the axis of the shaft and dividing a torque applied to the driving one of said members and transmitted through said cam surface into a circumferential component of force and an axial component of force acting on said sleeve, said stop means being axially adjustable to vary the point of engagement of said cam surface and said hub, circumferentially spaced portions of said cam surface having different angles of obliquity relative to the axis of said shaft whereby the magnitudes of said circumferential and axial components of force may be selectively varied by circumferentially and axially shifting the point of engagement of said cam surface and said hub.

6. Mechanism for controlling the transmission of torque between a drive member and a driven member as recited in claim 3 wherein said means interengaging said hub and said sleeve comprises a cam surface on the axial end of said hub opposite said one end, a cam surface on one end of said sleeve abutting said hub cam surface, said cam surfaces each extending circumferentially around at least a portion of said shaft and obliquely relative to the axis of the shaft whereby a torque applied to the driving one of said members and transmitted through said abutting cam surfaces is divided into a circumferential component of force acting on said sleeve, said stop means being axially adjustable to vary the point of engagement of said hub cam surface and said sleeve cam surface, circumferentially spaced portions of each of said cam surfaces having different angles of obliquity relative to the axis of said shaft whereby the magnitudes of said circumferential and axial components of force may be selectively varied by circumferentially and axially changing the point of engagement of said cam surfaces.

7. Mechanism for controlling the transmission of torque between a drive member and a driven member as recited in claim 3 wherein said means interengaging said hub and said sleeve comprises a cam surface on the axial end of said hub opposite said one end and against which one end of said sleeve abuts, said cam surface extending circumferentially around at least a portion of said shaft and obliquely relative to the axis of the shaft and dividing a torque applied to the driving one of said members into a circumferential component of force and an axial component of force acting on said sleeve, said sleeve having a plurality of radially extending holes therein, said holes being spaced apart circumferentially and axially, said sleeve being selectively positionable on said shaft to register any one of said radial holes in the sleeve with said radial hole in said shaft to receive said pin and thereby selectively vary the point of engagement of said sleeve and said cam surface, circumferentially spaced portions of said cam surface having different angles of obliquity relative to the axis of said shaft whereby the magnitudes of said circumferential and axial components of force may be selectively varied by circumferentially and axially varying the point of engagement of said cam surface and said sleeve.

8. Mechanism for controlling the transmission of torque between a drive member and a driven member as recited in claim 3 wherein said means interengaging said hub and said sleeve comprises a cam surface on one axial end of said sleeve and abutting the end of said hub opposite said one end, said cam surface extending circumferentially around at least a portion of said shaft and obliquely relative to the axis of the shaft and dividing a torque applied to the driving one of said members and transmitted through said cam surface into a circumferential component of force and an axial component of force acting on said sleeve, said sleeve having a plurality of radially extending holes therein, said holes being spaced apart circumferentially and axially, said sleeve being selectively positionable on said shaft to register any one of said radial holes in the sleeve with said radial hole in said shaft to receive said pin and thereby selectively vary the point of engagement of said cam surface and said hub, circumferentially spaced portions of said cam surface having different angles of obliquity relative to the axis of said shaft whereby the magnitudes of said circumferential and axial components of force may be selectively varied by circumferentially and axially shifting the point of engagement of said cam surface and said hub.

9. Mechanism for controlling the transmission of torque between a drive member and a driven member as recited in claim 3 wherein said means interengaging said hub and said sleeve comprises a cam surface on the axial end of said hub opposite said one end, a cam surface on one end of said sleeve abutting said hub cam surface, said cam surfaces each extending circumferentially around at least a portion of said shaft and obliquely relative to the axis of the shaft whereby a torque applied to the driving one of said members and transmitted through said abutting cam surfaces is divided into a circumferential component of force and an axial component of force acting on said sleeve, said sleeve having a plurality of radially extending holes therein, said holes being spaced apart circumferentially and axially, said sleeve being selectively positionable on said shaft to register any one of said radial holes in the sleeve with said radial hole in said shaft to receive said pin and thereby selectively vary the point of engagement of said hub cam surface and said sleeve cam surface, circumferentially spaced portions of each of said cam surfaces having different angles of obliquity relative to the axis of said shaft whereby the magnitudes of said circumferential and axial components of force may be selectively varied by circumferentially and axially changing the point of engagement of said cam surfaces.

References Cited by the Examiner

UNITED STATES PATENTS

| | | | |
|---|---|---|---|
| 1,672,582 | 6/28 | Tenney | 64—28 |
| 2,834,191 | 5/58 | Toothill | 64—29 |
| 2,964,931 | 12/60 | Sorenson | 64—28 |

ROBERT C. RIORDON, *Primary Examiner.*